United States Patent [19]

Pollock et al.

[11] 4,052,795

[45] Oct. 11, 1977

[54] MALTING AT LOW MOISTURE

[75] Inventors: James Richard Allan Pollock, Reading; Alan Aldred Pool, Camberley, both of England

[73] Assignee: Pollock and Pool Limited, Reading, England

[21] Appl. No.: 665,267

[22] Filed: Mar. 9, 1976

[30] Foreign Application Priority Data

Mar. 14, 1975 United Kingdom ............... 10777/75

[51] Int. Cl.² ............................................. F26B 7/00
[52] U.S. Cl. ......................................... 34/12; 195/70; 426/28
[58] Field of Search ............... 34/12, 19, 42; 426/28; 195/70

[56] References Cited

U.S. PATENT DOCUMENTS

| | | | |
|---|---|---|---|
| 1,071,184 | 8/1913 | Scott | 34/12 X |
| 1,187,702 | 6/1916 | Boss | 34/12 X |
| 3,174,909 | 3/1965 | Beckford et al. | 426/28 X |
| 3,754,929 | 8/1973 | Palmer | 426/28 |

*Primary Examiner*—John J. Camby
*Attorney, Agent, or Firm*—Larson, Taylor and Hinds

[57] ABSTRACT

This invention relates to malting, i.e. the conversion of cereal grain to malt. The invention provides a method of malting in which cereal grain is submitted to at least one treatment designed to rupture its surface without damaging the germinative ability of the grain, the grain is steeped, the moisture content of the said steeped and treated grain being insufficient to allow, during 5 days' subsequent storage in presence of air at 16° C, a growth of roots having a dry weight equal to more than 0.5% of the dry weight of the grain; treating such grain with gibberellic acid, exposing the grain to air and drying the grain.

11 Claims, No Drawings

MALTING AT LOW MOISTURE

In the process of malting, cereal grain, usually barley, is steeped or sprayed with water until its moisture content reaches about 46% and it is allowed to germinate for 4 to 8 days, during which the moisture content may fall to 44%, and the product then dried. The moisture content of the product, malt, usually varies between about 2 and 6%. Thus, if the average value of the malt moisture is taken as 4%, it is necessary to evaporate, in making one tonne of malt, 0.714 tonnes of water, the removal of which is a heavy cost in energy.

During conventional malting the grain develops roots and shows other signs of development, and its endosperm undergoes a series of chemical and physical changes with the production of enzymes which render it friable and capable of yielding a high percentage of extractable material when suitably ground and digested with hot water, which is not the case with the original grain. The changes which take place in the grain which allow this increase in available extract to take place are known collectively as modification. In malting it is an indication that the grain has modified adequately if the difference between the extracts obtainable when it is finely or coarsely ground does not exceed 4% or is preferably less than 2.5%. The conditions under which these extracts are obtained and measured are defined in Analytica E.B.C. It is known that malt may be made to meet the aforementioned Specification when barley is steeped to a lower moisture level than that quoted above but 40% would be regarded as the minimum allowing this to be done, and then only in exceptional circumstances. The present invention provides means by which malt (as defined) can in fact be made at significantly lower levels of moisture than this. In such circumstances the growth of roots is very much restricted, which provides further advantages.

According to the invention, a method of malting is provided in which cereal grain is submitted to at least one treatment designed to rupture its surface without damaging the germinative ability of the grain, the grain is steeped, the moisture content of the said steeped and treated grain being insufficient to allow, during 5 days' subsequent storage in presence of air at 16° C, a growth of roots having a dry weight equal to more than 0.5% of the dry weight of the grain; treating such grain with gibberellic acid, exposing the grain to air and drying the grain. For this purpose we prefer to squeeze the steeped grain between rollers to an extent sufficient to deform it during the treatment but insufficiently to provide a major permanent distortion of the grain. Other methods of physically damaging the grain, such as abrasion, may be employed with beneficial effect also.

The amount of gibberellic acid used to treat the grain is equivalent to at least one part per million of grain (dry weight basis).

The moisture content of the grain varies according to the type of grain due to biological variability, but it is normally greater than 25% and usually only up to 40%.

The advantages arising from the making of malt by the method of this invention include cost reductions in drying, a gain in the yield of malt, increased productivity of malthouses because the grains required to produce a given weight of malt occupy less space than that needed for conventional production, and reducing air-conditioning requirements because there is less heat of respiration to be removed.

As examples of the results obtained by the use of the invention, we cite the results of the following trials:

A. A barley sample was malted conventionally, and further samples of the same barley were malted according to the method of the invention wherein grain was passed between rollers set 1.8mm apart. The products were analysed by standard methods (E.B.C.) with the following result.

According to the invention:

| Moisture content after steeping (%) | Days in air after steeping | Gibberellic acid added (p.p.m.) | Extract (%) coarse grind | Fine-coarse differ- ence (%) | Root growth (% of grain) |
|---|---|---|---|---|---|
| 37.6 | 6 | 1 | 75.9 | 3.8 | 0.01 |
| 40.1 | 5 | 1 | 79.4 | 2.0 | 0.3 |
| 37.6 | 6 | 5 | 77.9 | 2.7 | 0.02 |
| 40.1 | 5 | 5 | 80.8 | 1.2 | 0.4 |
| 37.6 | 6 | 10 | 79.3 | 2.2 | 0.1 |
| 40.1 | 5 | 10 | 82.2 | 0.5 | 0.4 |
| 36.0 | 4 | 5 | 79.0 | 2.3 | 0.01 |
| 36.0 | 4 | 10 | 79.5 | 2.1 | 0.01 |
| 36.0 | 5 | 5 | 80.3 | 2.3 | 0.02 |
| 36.0 | 5 | 10 | 80.8 | 2.0 | 0.03 |
| 36.0 | 6 | 5 | 81.5 | 1.4 | 0.05 |
| 36.0 | 6 | 10 | 81.5 | 1.4 | 0.05 |
| Conventional malting: | | | | | |
| 46.0 | 5 | 0.2 | 79.3 | 1.5 | 2.8 |
| 36.0 | 5 | 5 | 68.5 | 8.0 | 0.05 |

We have found that the soluble nitrogen content of the malts produced by the method of the invention increase with increasing use of gibberellic acid and with increasing moisture content. Thus they are controllable by adjustment of these two variables and are also controllable by addition of soluble bromates as shown for typical results below:

| Addition of bromate (p.p.m. of grain) | Total soluble nitrogen of malt (% of malt, dry basis) |
|---|---|
| 0 | 0.59 |
| 200 | 0.41 |
| 400 | 0.37 |
| 800 | 0.36 |

B. A sample of barley which had been abraded so that 1% of its weight had been removed was malted conventionally and further samples of the same abraded barley were malted according to the method of the invention. The products were analysed by standard methods (E.B.C.) with the following result:

| Moisture content after steeping (%) | Days in air after steeping | Gibberellic acid added (p.p.m.) | Extract (%) coarse grind | Fine-coarse extract differ- ence (%) | Root growth (% of grain) |
|---|---|---|---|---|---|
| Method of the invention | | | | | |
| 35 | 6 | 1 | 79.2 | 1.8 | 0.2 |
| 35 | 6 | 5 | 80.0 | 1.5 | 0.2 |
| 35 | 6 | 7.5 | 81.5 | 1.0 | 0.3 |
| 35 | 6 | 10 | 82.0 | 0.8 | 0.5 |
| 35 | 6 | 15 | 82.2 | 0.8 | 0.5 |
| 38 | 5 | 1 | 79.2 | 2.0 | 0.3 |
| 38 | 5 | 4 | 80.8 | 1.2 | 0.3 |
| 38 | 5 | 5 | 79.3 | 1.3 | 0.4 |
| 38 | 5 | 10 | 81.3 | 1.4 | 0.5 |
| Conventional malting | | | | | |
| 47.3 | 5 | 0.4 | 79.5 | 1.7 | 3.3 |

We claim:
1. In a method of malting a cereal grain which comprises: steeping cereal grain in water; allowing the steeped grain to germinate during which time the grain develops roots and undergoes a series of chemical and physical changes with the production of enzymes which render the grain capable of yielding a high percentage of extractable material when ground and extracted with hot water; treating the grain with gibberellic acid; exposing the grain to air; and drying the germinated grain;

the improvement which comprises:
rupturing the surface of the cereal grain without damaging the germinative ability of the grain; and
providing water during germination in an amount insufficient to allow a root growth having a dry weight equal to more than 0.59% of the dry weight of the grain if the grain were allowed to germinate for five days in the presence of air at 16° C.

2. An improved method according to claim 1 wherein said cereal is barley.

3. An improved method according to claim 2 wherein the surface of said grain is ruptured by passing the grain between rollers set so as to deform the grain during such passage but not to provoke a major permanent distortion of the grain.

4. An improved method according to claim 2 wherein the surface of said grain is ruptured by abrading the grain surface.

5. An improved method according to claim 2 wherein the surface of said grain is ruptured after the grain is steeped.

6. An improved method according to claim 2 wherein the water content during germination is not greater than 40%, wet weight basis.

7. An improved method according to claim 6 wherein said water content is greater than 25%.

8. An improved method according to claim 2 wherein the water content during germination is from 35 to 40.1%, wet weight basis.

9. An improved process according to claim 2 wherein the amount of gibberellic acid used to treat the grain is at least one part per million, dry weight basis.

10. An improved process according to claim 9 wherein the amount of gibberellic acid is from 1 to 6 parts per million.

11. An improved process according to claim 2 including the further step of treating the grain with a solution containing a soluble bromate.

* * * * *